United States Patent
Groth et al.

(10) Patent No.: US 10,282,846 B2
(45) Date of Patent: May 7, 2019

(54) MODEL-BASED SEGMENTATION OF AN ANATOMICAL STRUCTURE

(71) Applicant: KONINKLIJKE PHILIPS N.V., Eindhoven (NL)

(72) Inventors: Alexandra Groth, Hamburg (DE); Hannes Nickisch, Hamburg (DE); Frank Michael Weber, Hamburg (DE); Juergen Weese, Norderstedt (DE); Hans Barschdorf, Dassendorf (DE)

(73) Assignee: Koninklijke Philips N.V., Eindhoven (NL)

( * ) Notice: Subject to any disclaimer, the term of this patent is extended or adjusted under 35 U.S.C. 154(b) by 18 days.

(21) Appl. No.: 15/039,899

(22) PCT Filed: Dec. 2, 2014

(86) PCT No.: PCT/EP2014/076169
§ 371 (c)(1),
(2) Date: May 27, 2016

(87) PCT Pub. No.: WO2015/086368
PCT Pub. Date: Jun. 18, 2015

(65) Prior Publication Data
US 2016/0379372 A1    Dec. 29, 2016

(30) Foreign Application Priority Data
Dec. 10, 2013    (EP) .................................... 13196453

(51) Int. Cl.
*G06K 9/00* (2006.01)
*G06T 7/149* (2017.01)
*G06T 7/12* (2017.01)

(52) U.S. Cl.
CPC ................ *G06T 7/149* (2017.01); *G06T 7/12* (2017.01); *G06T 2207/10028* (2013.01); *G06T 2207/10072* (2013.01); *G06T 2207/30048* (2013.01)

(58) Field of Classification Search
CPC .......... A61B 2576/00; A61B 2576/023; A61B 5/0033; G06K 2209/05; G06K 2209/051;
(Continued)

(56) References Cited

U.S. PATENT DOCUMENTS 5,601,084 A  * 2/1997 Sheehan ................ B82Y 15/00
                                                      600/450
7,079,674 B2    7/2006 Paragios et al.
(Continued)

OTHER PUBLICATIONS

Einstein et al ("Fluid structure interactions of the mitral valve and left heart: comprehensive strategies, past, present and future", 2008).*
(Continued)

*Primary Examiner* — Avinash Yentrapati (57) ABSTRACT

A method is provided for generating a deformable model (300) for segmenting an anatomical structure in a medical image. The anatomical structure comprises a wall. The deformable model (300) is generated such that it comprises, in addition to two surface meshes (320, 360), an intermediate layer mesh (340) for being applied in-between a first surface layer of the wall and a second surface layer of the wall. In generating the intermediate layer mesh (340), the mesh topology of at least part (400) of the intermediate layer mesh is matched to the mesh topology of one of the surface meshes (320, 360), thereby establishing matching mesh topologies. The deformable model (300), as generated, better matches the composition of such walls, thereby providing a more accurate segmentation.

12 Claims, 3 Drawing Sheets

(58) Field of Classification Search
CPC ......... G06T 7/0012; G06T 2207/30004; G06T 2207/30048; G06T 2207/30041
See application file for complete search history.

(56) References Cited

U.S. PATENT DOCUMENTS

| | | | |
|---|---|---|---|
| 7,945,080 B2 | 5/2011 | Rinck et al. | |
| 8,463,008 B2 | 6/2013 | Ciofolo-Veit | |
| 8,509,506 B2 | 8/2013 | Ciofolo | |
| 8,526,697 B2* | 9/2013 | Blaffert | G06T 7/149 382/131 |
| 8,989,472 B2 | 3/2015 | Porikli et al. | |
| 9,730,663 B2* | 8/2017 | Koehler | G06T 7/149 |
| 2007/0058865 A1* | 3/2007 | Li | G06K 9/4638 382/173 |
| 2008/0317308 A1* | 12/2008 | Wu | G06K 9/4638 382/128 |
| 2009/0116709 A1 | 5/2009 | Sun et al. | |
| 2009/0136103 A1 | 5/2009 | Sonka et al. | |
| 2009/0267941 A1* | 10/2009 | Von Berg | G06T 17/20 345/423 |
| 2010/0014736 A1* | 1/2010 | Barschdorf | G06T 7/33 382/131 |
| 2010/0027861 A1* | 2/2010 | Shekhar | G06K 9/6207 382/131 |
| 2010/0303328 A1 | 12/2010 | Ciofolo et al. | |
| 2011/0038516 A1* | 2/2011 | Koehler | G06T 7/149 382/128 |
| 2011/0052018 A1* | 3/2011 | Blaffert | G06T 5/003 382/128 |
| 2011/0103661 A1* | 5/2011 | Schummers | G06T 17/00 382/128 |
| 2012/0022843 A1* | 1/2012 | Ionasec | G06T 13/20 703/9 |
| 2012/0082354 A1* | 4/2012 | Peters | G06T 7/60 382/128 |
| 2013/0129170 A1* | 5/2013 | Zheng | G06T 7/149 382/131 |
| 2013/0266230 A1* | 10/2013 | Peters | G06T 7/75 382/224 |
| 2015/0359601 A1* | 12/2015 | Sauer | G06T 7/0012 382/128 |
| 2016/0306023 A1* | 10/2016 | Zagorchev | G01R 33/5608 |
| 2016/0379372 A1* | 12/2016 | Groth | G06T 7/149 382/131 |

OTHER PUBLICATIONS

Ecabert, O. et al., "Automatic Model-based Segmentation of the Heart in CT Images", IEEE Transactions on Medical Imagining 2008, 27(9), pp. 1189-1201.

Nickisch, H. et al., "From Image to Personalized Cardiac Simulation: Encoding Anatomical Structures into a Model-Based Segmentation Framework". STACOM, 2012, Abstract.

Einstein, D.R. et al., "Fluid-structure interactions of the mitral valve and left heart: Comprehensive strategies, past, present and future", International Journal for Numerical Methods in Biomedical Engineering, vol. 26, No. 3-4, (2010), pp. 348-380.

Bay, T. et al., "Poster: Geometric modeling of pelvic organs with a discrete offset approach", Proc. of the 20th International Conference in Central Europe on Computer Graphics, Visualization and Computer Vision 2012, pp. 1-4.

Bajaj, C. et al., "Multi-component heart reconstruction from volumetric imaging", Proceedings of the 2008 ACM Symposium on Solid and Physical Modeling, SPM '08, 2008, p. 193.

Weese, J. et al., "Medical & Biological Engineering & Computing manuscript : Generating Anatomical Models of the Heart and the Aorta from Medical Images for Personalized Physiological Simulations", Medical & Biological Engineering & Computing, 2013, Abstract.

Lehmann, H. et al., "Integrating Viability Information into a Cardiac Model for Interventional Guidance", 2009, Functional Imaginig and Modeling of the Heart, Abstract.

Kuprat A.P. et al, "An anisotropic scale-invariant unstructured mesh generator suitable for volumetric imaging data", Journal of Computational Physics, vol. 228, No. 3, 2009, Abstract.

Dong-Jin Yoo, "General 3D offsetting of a triangular net using an implicit function and the distance fields", International Journal of Precision Engineering and Manufacturing, vol. 10, No. 4, 2009, Abstract.

Xu, K et al., "Quality encoding for tetrahedral mesh optimization", Computers and Graphics, 2009, vol. 33, No. 3, Abstract.

Hoppe, H. et al., "Mesh Optimization", Computer Graphics Proceedings, Proceedings of Siggraph Annual International Conference on Computer Graphics and Interactive Techniques, 1993, pp. 19-26.

Niedel L.P., "Anatomic Modeling of Human Bodies Using Physically-Based Muscle Simulation", Thesis, 1998, MSc in Computer Science, Lausanne, EPFL.

Reis, G. et al., "Towards a Virtual Echocardiographic Tutoring System", Book title: Visualization in Medicine and Life Sciences, Part II, pp. 99-119, 2008.

Zeng, X. et al., "Volumetric Layer Segmentation Using Coupled Surfaces Propagation", Proceedings of IEEE CVPR 1998, pp. 708-715.

Young, P.G. et al., "An efficient approach to converting three-dimensional image data into highly accurate computational models", Phil. Trans. R. Soc. A (2008) 366, 3155-3173.

Mitchell, S.C., et al., "3-D Active Appearance Models: Segmentation of Cardiac MR and Ultrasound Images", IEEE Transactions on Medical Imaging, vol. 21, No. 9, Sep. 2002.

Petrov, V.O. et al. "The Modification of Active Contour Algorithm". Modem Problems of Science and Education. 2008, No. 6, p. 14-19.

* cited by examiner

MODEL-BASED SEGMENTATION OF AN ANATOMICAL STRUCTURE

CROSS-REFERENCE TO PRIOR APPLICATIONS

This application is the U.S. National Phase application under 35 U.S.C. § 371 of International Application No. PCT/IB2014/076169, filed on Dec. 2, 2014, which claims the benefit of European Patent Application No. 13196453.8, filed on Dec. 10, 2013. These applications are hereby incorporated by reference herein.

FIELD OF THE INVENTION

The invention relates to a method for generating a deformable model for segmenting an anatomical structure in a medical image. The invention further relates to model data being obtainable by the method. The invention further relates to a system for applying the deformable model to the anatomical structure in the medical image.

BACKGROUND OF THE INVENTION

Robust automatic segmentation of various anatomical structures in a medical image is a key enabler in improving clinical workflows. Here, the term segmentation refers to the identification of the anatomical structure in the medical image by, e.g., delineation of the boundaries of the anatomical structure, or by labeling of the voxels enclosed by the boundaries. Once such segmentation has been performed, it is possible to extract clinical parameters such as, in case of a cardiac structure, ventricular mass, ejection fraction and wall thickness. Consequently, automatic segmentation can significantly reduce the scan-to-diagnosis time, and thus help clinicians in establishing more efficient patient management.

It is known to segment an anatomical structure in a medical image using a deformable model. Such type of segmentation is also referred to as model-based segmentation. The deformable model may be defined by model data. In particular, the model data may define a geometry of the anatomical structure, e.g., in the form of a multi-compartmental mesh of triangles. Inter-patient and inter-phase shape variability may be efficiently modeled by assigning an affine transformation to each part of such a deformable model. Affine transformations cover translation, rotation, scaling along different coordinate axes and shearing. Moreover, mesh regularity may be maintained by interpolation of the affine transformations at the transitions between different parts of the deformable model. It is noted that such types of deformable models are also referred to as mean shape models.

The applying of a deformable model to the image data of the medical image, also referred to as mesh adaptation, may involve optimizing an energy function which may be based on an external energy term which helps to adapt the deformable model to the image data and an internal energy term which maintains a rigidness of the deformable model.

Deformable models of the above described type are known per se, as are methods of applying such models to an anatomical structure in a medical image.

For example, a publication titled "*Automatic Model-based Segmentation of the Heart in CT Images*" by O. Ecabert et al., IEEE Transactions on Medical Imaging 2008, 27(9), pp. 1189-1201, describes a model-based approach for the automatic segmentation of the heart (four chambers, myocardium, and great vessels) from three-dimensional (3D) Computed Tomography (CT) images. Here, model adaptation is performed progressively increasing the degrees-of-freedom of the allowed deformations to improve convergence as well as segmentation accuracy. The heart is first localized in the image using a 3D implementation of the generalized Hough transform. Pose misalignment is corrected by matching the model to the image making use of a global similarity transformation. The complex initialization of the multi-compartment mesh is then addressed by assigning an affine transformation to each anatomical region of the model. Finally, a deformable adaptation is performed to accurately match the boundaries of the patient's anatomy.

SUMMARY OF THE INVENTION

A problem of the known deformable models is that they are insufficiently suitable for providing a detailed segmentation of a wall of such anatomical structures. Here, the term 'wall' refers to a layered structure having one or more anatomical layers. Examples of such layered structures include the heart wall, the abdominal wall, etc.

It would be advantageous to have a deformable model which provides a more detailed segmentation of the wall of an anatomical structure.

To better address this concern, a first aspect of the invention provides a method for generating a deformable model for segmenting an anatomical structure in a medical image, the anatomical structure comprising a wall having a first surface layer and a second surface layer, the method comprising:

providing a first surface mesh for being applied to the first surface layer of the wall during a model-based segmentation;

providing a second surface mesh for being applied to the second surface layer of the wall during the model-based segmentation;

generating an intermediate layer mesh for being applied in-between the first surface layer and the second surface layer during the model-based segmentation, said generating comprising matching a mesh topology of at least part of the intermediate layer mesh to the mesh topology of an anatomically corresponding part of a selected one of both surface meshes, thereby establishing matching mesh topologies; and generating model data defining the first surface mesh, the second surface mesh and the intermediate layer mesh.

A further aspect of the invention provides model data defining a deformable model, the deformable model being arranged for segmenting an anatomical structure in a medical image, the anatomical structure comprising a wall having a first surface layer and a second surface layer, the model data comprising:

a first surface mesh for being applied to the first surface layer of the wall during a model-based segmentation;

a second surface mesh for being applied to the second surface layer of the wall during the model-based segmentation; and an intermediate layer mesh for being applied in-between the first surface layer and the second surface layer during the model-based segmentation, wherein at least part of the intermediate layer mesh comprises a mesh topology which matches the mesh topology of an anatomically corresponding part of a selected one of both surface meshes, thereby establishing matching mesh topologies.

A further aspect of the invention provides a system for applying a deformable model to an anatomical structure in a medical image, the anatomical structure comprising a wall having a first surface layer and a second surface layer, the system comprising:

a data storage comprising the model data, the model data defining the deformable model; and a processing subsystem configured for applying the deformable model to the anatomical structure in the medical image.

The above measures involve the generation and application of a deformable model to an anatomical structure such as an organ, part of an organ, etc. The anatomical structure is represented by image data of a medical image. Such medical images are typically of a patient and may be obtained using an imaging modality such as, but not limited to, CT, Magnetic Resonance (MR) imaging, etc. The anatomical structure comprises a wall which is a layered structure having one or more anatomical layers. An example of such a wall is a heart wall, an abdominal wall, a gray/white matter wall in the brain etc. The deformable model is arranged for being applied to a wall which comprises two surface layers, namely a first surface layer and a second surface layer. For example, in case of a heart wall, the surface layers are the epicardium, being the outer surface layer of the heart wall, and the endocardium being the inner surface layer of the heart wall.

The deformable model is generated as follows. Two surface meshes are provided for being applied to the respective surface layers of the wall. Such surface meshes may be generated in a known manner, for example as described by the earlier mentioned publication "*Automatic Model-based Segmentation of the Heart in CT Images*" or by means of any other suitable known technique. Providing such surface meshes may also involve obtaining them from an external source, such as a previously generated deformable model, from a training algorithm, a user-controlled model generation, etc. As a result, for each of the surface layers, a surface mesh is obtained. Such a mesh is typically comprised of nodes, also referred to as points, of the respective surface mesh and interconnections between the nodes. Examples of meshes include triangle meshes, quadrilateral meshes as well as other types of polygon meshes. Such types of meshes are known per se from the field of computer graphics and, when used in model-based image segmentation, also from the medical domain.

In accordance with the invention, at least one intermediate layer mesh is generated. The intermediate layer mesh is arranged for being applied to the image data of the medical image in-between the inner surface layer and the outer surface layer of the wall, thereby establishing an intermediate layer within the wall's volume. The intermediate layer mesh is generated in such a way that the mesh topology at least locally matches that of one of the surface meshes. Here, the term 'mesh topology' refers to the structure as provided by at least i) the number of nodes, and ii) their mutual interconnections, i.e., which node is connected to which node. This structure may, but does not need to, denote a similar shape of the nodes, i.e., their relative position. The mesh topology matches between anatomically corresponding parts of the surface mesh and the intermediate layer mesh. Such anatomically corresponding parts are typically denoted by a same or similar position along the wall.

Having generated the intermediate layer mesh, model data is generated which defines the first surface mesh, the second surface mesh and the intermediate layer mesh. Such model data represents a computer readable definition of the deformable model, and may be stored on a computer readable medium such as semiconductor memory, a magnetic or optical disk, etc. Having generated the model data, the deformable model may be applied to an anatomical structure in a medical image, namely by applying the first surface mesh to the first surface layer of the wall, the second surface mesh to the second surface layer, and the intermediate layer mesh in-between the first surface layer and the second surface layer.

The invention is based on an insight which originated from the medical application domain of heart segmentation. Here, heart segmentation models are typically single layer models which only segment the heart surface. Only for the left ventricle and atrium, so-termed double layer models are available which can segment both the left ventricular endocardium and epicardium. In cases where a volumetric mesh is needed, e.g., for the storage of spatially distributed functional information such scar information, a tetrahedral mesh is included between the endo- and epicardium. The volumetric mesh may constructed by a meshing tool, such as tetgen (http://tetgen.berlios.de/), while providing certain limited quality restrictions, such as radius-edge ratio of tetrahedron.

Disadvantageously, the current volumetric meshes neither reflect the actual composition of the heart walls nor allow the storage of scar information with a minimal depth precision. Here, the term 'depth precision' refers to a spatial resolution of the deformable model across the wall. The latter problem results from the fact that current meshing methods do not guarantee a certain minimal number of tetrahedra on the way between inner and outer heart surface. However, the scar information is stored in a binary way (scar of none scar) for each tetrahedron. So in the worst case scenario the complete wall depth is represented by a single tetrahedron indicating scar already for 50% transmurality.

The inventors have further realized that such problems may equally occur in the segmentation of other anatomical structures. The invention addresses these problems by providing a deformable model which comprises an intermediate layer mesh for being applied in-between the first surface layer and the second surface layer during the model-based segmentation. The intermediate layer mesh is generated in such a way that the mesh topology of at least part of the intermediate layer mesh matches that of an anatomically corresponding part of one of the surface meshes. This establishes regularity in the deformable model which is useful for further meshing steps and visualization. Namely, the regularity in the topology of the meshes automatically visually emphasizes a lack of regularity in other aspects of the meshes after being applied, e.g., such as irregularities in the shape, distance between the meshes, etc. Such irregularities are frequently tied to anatomical abnormalities, thereby enabling a user to detect such abnormalities with less cognitive burden. Advantageously, the deformable model better matches the composition of the wall, thereby providing a more accurate segmentation. In case of heart segmentation, this allows scar information to be stored at a higher depth precision, as well as a minimal depth precision to be guaranteed.

Optionally, the generating of the intermediate layer mesh comprises duplicating the part of the selected surface mesh to obtain the part of the intermediate layer mesh. By duplicating the part of the selected surface mesh, it is ensured that matching mesh topologies are established between the intermediate layer mesh and the selected surface mesh. Advantageously, the part of the intermediate layer mesh is efficiently generated.

Optionally, the generating of the model data comprises defining correspondences between original nodes of the selected surface mesh and duplicated nodes of the intermediate layer mesh, thereby establishing a plurality of node pairs. By duplicating the part of the selected surface mesh, it is known how the mesh topologies match since for each original node of the part of the selected surface mesh, a duplicated node of the intermediate layer mesh exists. Here, the term 'original' refers to a source of the duplication, i.e., a source node. Accordingly, data defining such correspondences can be easily generated.

Optionally, the generating of the model data further comprises defining distances between the original nodes and the duplicated nodes of the node pairs. Hence, the intermediate layer mesh is generated to be initially positioned at a certain distance from the selected surface mesh.

Optionally, the method further comprises:

providing a first set of distances for a first subset of the node pairs;

obtaining a second set of distances for a second subset of the node pairs by interpolating the first set of distances.

Instead of directly defining the distances for all node pairs, the distances are initially only defined for a subset of the node pairs, and the distances for the remaining node pairs are generated by means of interpolation. For example, the first subset of node pairs may be selected to coarsely cover the (parts of the) respective meshes, and the second subset of node pairs may be distributed intermixed between the first subset of node pairs.

Optionally, the method further comprises generating a volume mesh between the intermediate layer mesh and the selected surface mesh based on the correspondences between the original nodes and the duplicated nodes of the node pairs. By generating the volume mesh based on correspondences between the respective node pairs, the volume mesh is well defined since it takes into account the matching mesh topologies between the selected surface mesh and the intermediate layer mesh. For example, the correspondences may be used as edges of the volume mesh. As a result, a volume mesh is obtained which fills the at least part of the cavity between the intermediate layer mesh and the selected surface mesh and which exhibits a regularity. It is noted that if more than one intermediate layer mesh is generated, the volume mesh may be generated for one cavity and subsequently duplicated for being applied to the other cavities, i.e., in between the intermediate layer meshes.

Optionally, the method further comprises generating a number of intermediate layer meshes for being applied in-between the first surface layer and the second surface layer of the wall, the number being larger than one. By generating more than one intermediate layer mesh, the deformable model is generated to fit more than one intermediate anatomical layer and/or artificially defined layer. Advantageously, by generating a number of intermediate layer meshes, the spatial resolution of the deformable model is increased, thereby providing a depth higher precision.

Optionally, the number is established based on at least one of the group of: an input from a user, an anatomy of the wall, and a spatial resolution of the medical image. The user may directly select or indirectly influence the number of intermediate layer meshes. The number may also be determined by an anatomy of the wall, e.g., to reflect the actual number of anatomical layers in-between both surface layers. The number may also be determined by a spatial resolution of the medical image, thereby taking into account that a higher spatial resolution provides a better imaging of intermediate anatomical layers and thus allows more intermediate layer meshes to be fitted to the image data of the wall.

Optionally, the intermediate layer mesh is generated for being applied to one of the group of: an intermediate anatomical layer of the wall, and an artificially defined layer. Accordingly, the intermediate layer mesh may be arranged for fitting an actual intermediate anatomical layer of the wall, or may rather represent an artificially defined layer. Such artificially defined layers increase the spatial resolution of the deformable model across the wall, which may be advantageous for further processing despite there not existing actual intermediate anatomical layer(s), or such intermediate anatomical layer(s) being poorly visible in the medical image and thus not being suitable for being directly segmented.

Optionally, the method further comprises:

providing one of: the first surface mesh and the second surface mesh; and generating the remaining one of: the first surface mesh and the second surface mesh, said generating comprising establishing matching mesh topologies for anatomically corresponding parts of both surface meshes.

Accordingly, one surface mesh is provided, and the intermediate layer mesh(es) as well as the other surface mesh are generated based on the provided surface mesh. For example, an outer surface mesh may be provided, and the intermediate layer mesh and the inner surface mesh may be generated by duplicating parts or all of the outer surface mesh. Advantageously, also the surface meshes have matching mesh topologies.

Optionally, the method further comprises establishing matching mesh topologies in the intermediate layer mesh and the selected surface mesh for substantially all continuous parts of the wall. As such, the mesh topologies between the intermediate layer mesh and the selected surface mesh match except at discontinuities of the wall. Such discontinuities may have an anatomical reason, e.g., a blood vessel running through the wall, and may result in the wall having an irregular shape. Accordingly, it may not be possible or desired to establish matching mesh topologies at or near such discontinuities.

Optionally, in the system, the processing subsystem is configured for applying the deformable model to the anatomical structure by:

applying the first surface mesh to the first surface layer of the anatomical structure and the second surface mesh to the second surface layer of the anatomical structure based on an optimization comprising an external energy term, the external energy term being defined as a function of image data of the medical image; and applying the intermediate layer mesh in-between the first surface layer and the second surface layer of the wall based on one of the group of: use of an internal energy term in the optimization, and data being indicative of a relative position of the intermediate layer mesh with respect to one of said applied surface meshes.

The above manners of applying the intermediate layer mesh take into account that intermediate anatomical layer(s) of the wall may be poorly visible, or may not actually exist at all. By using an internal energy term or a relative encoding of nodes of the intermediate layer mesh with respect to one of the applied surface meshes, the intermediate layer mesh can nevertheless be applied in-between both surface layers of the wall.

In summary, a method is provided for generating a deformable model for segmenting an anatomical structure in a medical image. The anatomical structure comprises a wall. The deformable model is generated such that it comprises, in addition to two surface meshes, an intermediate layer mesh for being applied in-between a first surface layer of the wall and a second surface layer of the wall. In generating the intermediate layer mesh, the mesh topology of at least part of the intermediate layer mesh is matched to the mesh topology of one of the surface meshes, thereby establishing matching mesh topologies. The deformable model as generated better matches the composition of such walls, thereby providing a more accurate segmentation.

It will be appreciated by those skilled in the art that two or more of the above-mentioned embodiments, implementations, and/or aspects of the invention may be combined in any way deemed useful.

Modifications and variations of the system and/or the computer program product, which correspond to the described modifications and variations of the method, can be carried out by a person skilled in the art on the basis of the present description.

A person skilled in the art will appreciate that the invention may be applied to multi-dimensional image data, e.g. to two-dimensional (2D), three-dimensional (3D) or four-dimensional (4D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

The invention is defined in the independent claims. Advantageous embodiments are defined in the dependent claims.

BRIEF DESCRIPTION OF THE DRAWINGS

These and other aspects of the invention are apparent from and will be elucidated with reference to the embodiments described hereinafter. In the drawings.

DETAILED DESCRIPTION OF EMBODIMENTS

Figure 1:
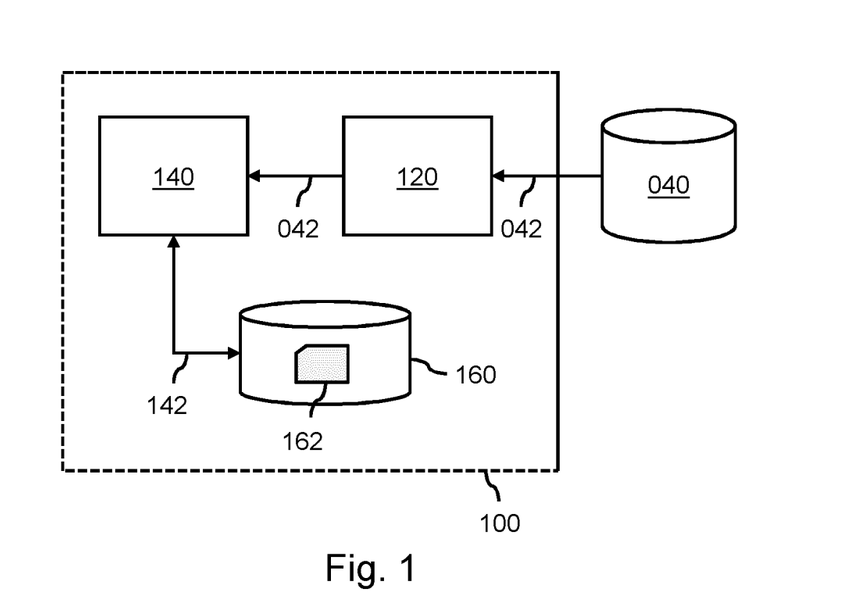
FIG. 1 shows a system for generating a deformable model for segmenting an anatomical structure in a medical image, with the system being, by way of example, also arranged for applying the deformable model to image data of the medical image.

FIG. 1 shows a system for generating a deformable model for segmenting an anatomical structure in a medical image, as well as a system for applying the deformable model to the anatomical structure in the medical image. By way of example, FIG. 1 shows a single system 100 providing both functionalities. It will be appreciated, however, that in practice both functionalities may be separated, i.e., performed by different systems.

Referring firstly to the generating of the deformable model, the system 100 may comprise a processing subsystem 140 configured for:

i) providing a first surface mesh for being applied to the first surface layer of the wall during a model-based segmentation, ii) providing a second surface mesh for being applied to the second surface layer of the wall during the model-based segmentation, and iii) generating an intermediate layer mesh for being applied in-between the first surface layer and the second surface layer during the model-based segmentation, said generating comprising matching a mesh topology of at least part of the intermediate layer mesh to the mesh topology of an anatomically corresponding part of a selected one of both surface meshes, thereby establishing matching mesh topologies.

Although not shown in FIG. 1, the first surface mesh and the second surface mesh may be obtained from an external source, such as from, e.g., a previously generated deformable model, a training algorithm, a user-controlled model generation, etc.

Having performed the above steps, the processing subsystem 140 may generate model data 162 defining the first surface mesh, the second surface mesh and the intermediate layer mesh. FIG. 1 shows the model data 162 having been stored in a data storage 160. The data storage 160 is shown to be an internal component of the system 100, and may be constituted by, e.g., a disk-based data storage such as a hard disk, a semiconductor-based data storage such as a ROM or RAM memory. Alternatively, the data storage 160 may be constituted by an external component, such as an external database or a removable storage medium which is accessed by the system 100 via a storage interface. To store the model data 162 in the data storage 160, the processing subsystem 140 is shown to communicate with the data storage 160 via an exchange of messages 142.

Referring now to the applying of the deformable model, the system 100 may comprise a processing subsystem 140 configured for applying the deformable model to the anatomical structure in the medical image. For that purpose, the processing subsystem 140 may retrieve the model data 162 defining the deformable model from the data storage 160, e.g., via the aforementioned exchange of messages 142. Moreover, the processing subsystem 140 may retrieve a medical image 042 via an image interface 120. For example, the medical image 042 may be retrieved from a database 040. The database 040 may be constituted or part of a Picture Archiving and Communication System (PACS) of a Hospital Information System (HIS) to which the system 100 may be connected or comprised in. Having obtained the medical image 042, i.e., in the form of image data, the processing subsystem 140 may apply the deformable model to the anatomical structure in the medical image. Accordingly, a segmentation of the anatomical structure is obtained, which may be used for further processing. For example, functional information may be calculated and stored.

It is noted that the operation of the system 100, and in particular the functionality of generating the deformable model, will be explained in more detail with reference to FIGS. 4 and 5, which, by way of example, involve a left heart ventricle.

Figure 2:
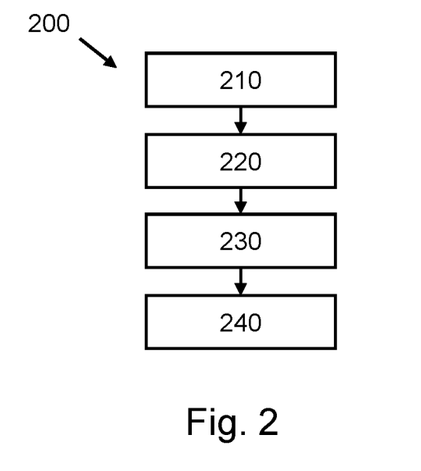
FIG. 2 shows a method for generating model data, the model data defining a deformable model for segmenting an anatomical structure in a medical image.

FIG. 2 shows a method 200 for generating a deformable model for segmenting an anatomical structure in a medical image. The method 200 may correspond to an operation of the system of FIG. 1, hereby referring to the system's configuration for generating the deformable model. It will be appreciated, however, that the method 200 may also be performed in separation of the system, e.g., using a different system or device.

The method 200 comprises, in a first step titled "PROVIDING FIRST SURFACE MESH", providing 210 a first surface mesh for being applied to the first surface layer of the wall during a model-based segmentation. The method 200 further comprises, in a second step titled "PROVIDING SECOND SURFACE MESH", providing 220 a second surface mesh for being applied to the second surface layer of the wall during the model-based segmentation. The method 200 further comprises, in a third step titled "GENERATING INTERMEDIATE LAYER MESH", generating 230 an intermediate layer mesh for being applied in-between the first surface layer and the second surface layer during the model-based segmentation, said generating comprising matching a mesh topology of at least part of the intermediate layer mesh to the mesh topology of an anatomically corresponding part of a selected one of both surface meshes, thereby establishing matching mesh topologies. The method 200 further comprised, in a fourth step titled "GENERATING MODEL DATA", generating 240 model data defining the first surface mesh, the second surface mesh and the intermediate layer mesh. It will be appreciated that first three steps may be performed in any suitable order, e.g., consecutively, simultaneously, or a combination thereof.

Figure 3:
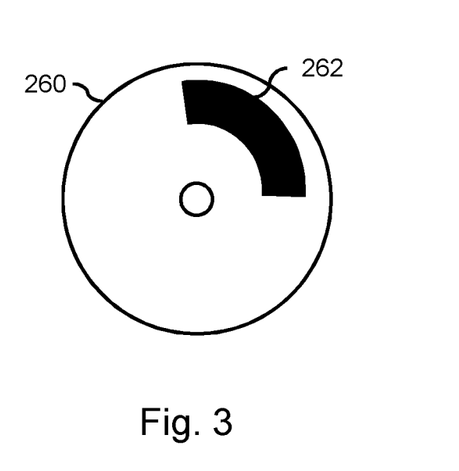
FIG. 3 shows a computer readable medium comprising model data defining the deformable model, the model data being obtainable by the method.

FIG. 3 shows a computer readable medium 260 comprising the model data 262 as obtainable from the method of FIG. 2. The model data 262 may be comprised in a non-transitory manner on the computer readable medium 260, e.g., as a series of machine readable physical marks and/or elements having different electrical or optical properties.

The generating of the deformable model may be explained in more detail as follows. Here, the deformable model is generated for segmenting a left ventricle of the human heart. However, this is not a limitation, in that such types of deformable models may be generated in an analogous manner for other types of anatomical structures.

The heart comprises a heart wall, i.e., a layered structure, with the heart wall being composed of three layers of tissue called the endocardium, the myocardium and the epicardium. The endocardium or inner layer is a thin layer of smooth muscle that allows blood to flow without difficulty. The myocardium or middle layer is the muscular layer and the thickest layer of the heart wall. The epicardium is the outer layer of the heart. In case of the left ventricle, the myocardium itself consists of three layers according to the longitudinal alignment of the myocardial strands: superficial (subepicardial), middle, and deep (subendocardial) layer. Importantly, these layers represent changes in orientation of the myocardial strands transmurally. The superficial layer occupies approximately 25% of the wall thickness, whereas the middle layer occupies approximately 53-59% of the ventricular wall thickness, being thickest near the base and thinning out towards the cardiac apex. The deep layer is the thinnest layer, accounting for <20% of the wall thickness. The left atrium has a similar construction, with two different layers of the myocardium.

Electro-mechanical simulations may be performed in order to support physicians in various types of cardiac interventions. Typically, in order to obtain a correct electro-mechanical simulation, a correct modeling of the heart wall is needed.

Figure 4:
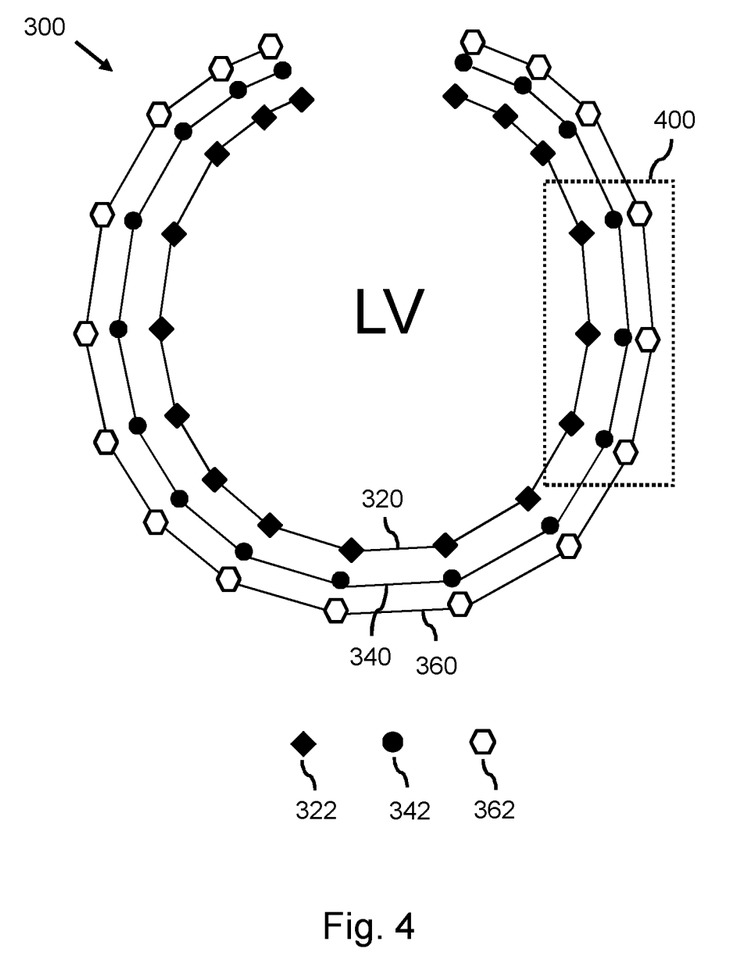
FIG. 4 shows a cross-section of a deformable model as generated by the method and/or system, the deformable model comprising a first surface mesh, a second surface mesh and an intermediate layer mesh comprised in-between both surface meshes.

FIG. 4 shows a two-dimensional (2D) cross-section of a three-dimensional (3D) deformable model 300 as generated in accordance with the present invention. The deformable model 300 comprises an inner surface mesh 320 for being applied to the inner surface layer of the left ventricle, i.e., the endocardium. The deformable model 300 further comprises an outer surface mesh 360 for being applied to the outer surface layer of the left ventricle, i.e., the epicardium. Moreover, the deformable model 300 comprises an intermediate layer mesh 340 for being applied in-between the first surface layer and the second surface layer during the model-based segmentation. Accordingly, the intermediate layer mesh 340 may be generated for being applied to one of the layers of the myocardium. FIG. 4 further shows nodes 322, 342, 362 of the respective meshes 320, 340, 360, with the nodes being shown to be interconnected, i.e., via edges, so as to form the respective mesh.

Although not shown in FIG. 4, the deformable model 300 as generated in accordance with the present invention may also comprise a number of intermediate layer meshes. For example, a first intermediate layer mesh may be provided for being applied to the superficial layer of the myocardium, a second intermediate layer mesh may be provided for being applied to the middle layer of the myocardium, and a third intermediate layer mesh may be provided for being applied to the deep layer of the myocardium.

The intermediate layer mesh 340 is generated so as to establish a matching mesh topology between anatomically corresponding parts 400 of the intermediate layer mesh 340 and at least one of the surface meshes 320, 360. In the example of FIG. 4, the surface layer meshes 320, 360 and the intermediate layer mesh 340 are shown to comprise matching topologies in that all meshes 320, 340, 360 are comprised of a same number of nodes, have same interconnections, and similar relative positions. In particular, the mesh topologies may match in substantially all continuous parts of the wall. Alternatively, the mesh topologies may only match in certain anatomically corresponding parts 400 of the respective meshes.

Figure 5:
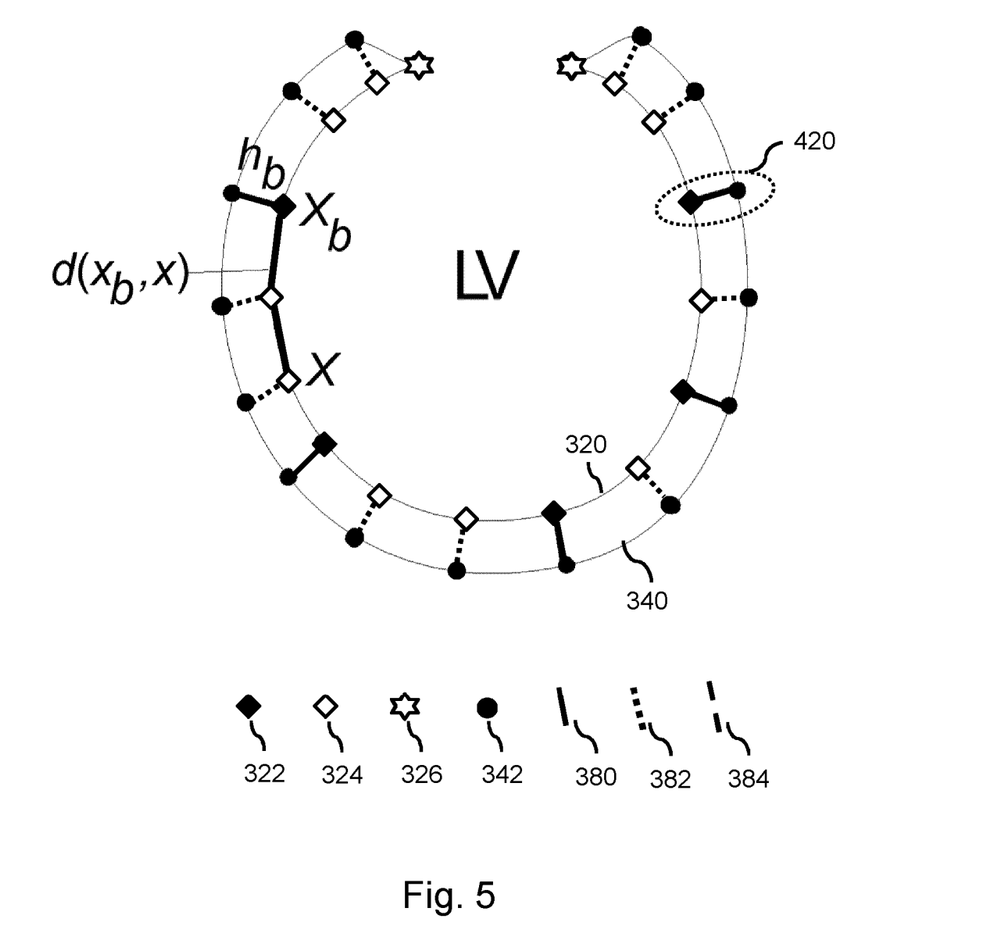
FIG. 5 illustrates a manner of generating the deformable model in which interpolation is used to obtaining a set of distances for a subset of node pairs.

FIG. 5 illustrates a particular manner of generating the deformable model 300. Here, the intermediate layer mesh 340 is generated by duplicating at least part of the inner surface mesh 320, i.e., the endocardial mesh. In particular, to obtain an intermediate layer mesh 340 for being applying to (a layer of) the myocardium, one of the surface meshes 320 of the heart part of interest, e.g., of the left ventricle or left atrium, may be duplicated and inflated such that the desired distance for the new intermediate layer mesh 340 to the original surface mesh 320 is obtained. At the borders of the intermediate layer mesh, e.g., at valve planes, in- and outflow of arteries and veins, the mesh nodes 322, 324 of the surface mesh 320 and the new intermediate layer mesh 340 may be tied together such that a cavity for the myocardium is obtained. Tying said meshes together may involve defining correspondences 380-384 between respective node pairs of, as a first node of each node pair, an original node 322, 324 of the selected surface mesh 320, and as a second node of each node pair, a duplicated node 342 of the new intermediate layer mesh 340. For example, the correspondence may indicate a same position, or a distance of zero. Alternatively, both nodes may be replaced by a single (joint) node for both meshes. FIG. 5 illustrates a node pairs 420 by means of a dashed ellipse encompassing an original node 322 and a duplicated node 324. The correspondence 380-384 may be constituted by, or additionally define, a distance between an original node 322 and a duplicated node 342 of each node pair.

For the calculation of the distance for the new intermediate layer mesh 340 to the original surface mesh 320, an interpolation with radial basis functions (RBF) may be used, as known per se from the field of mathematics. A RBF $\phi(x)$ is a real-valued function whose value depends only on the distance from some center point c such that $\phi(x,c)=\phi(\|x-c\|)$. Well known RBFs are Gaussian functions $\phi(r)=e^{-(\varepsilon r)^2}$, multiquadric, inverse quadratic, inverse multiquadric, polyharmonic spline, and thin plate spline functions.

For the interpolation with RBFs, a set of N base nodes $x_b$ 322 may be defined. These base nodes 322 are indicated in FIG. 5 as filled (black) diamonds, and may be selected nodes of the surface mesh 320 for which a desired distance $h_b$ 380 between the surface mesh 320 and the new intermediate layer 340 is given, e.g., as derived from anatomical constraints, from spatial resolution requirements or arbitrarily chosen by a user. The interpolation nodes x 324 are indicated in FIG. 5 as non-filled (white) diamonds 324. For these interpolation nodes 324, the distance h(x) between the surface mesh 320 and intermediate layer 340 may be unknown in advance and may have to be determined by the RBF interpolation. Accordingly, h(x) may be obtained from the superposition of N weighted RBFs (here: Gaussian functions), taking the distance from the base nodes $x_{b,i}$ to the interpolation nodes x into account:

$$h(x)=\Sigma_{i=1}^{N} w_i \phi(d(x_{b,i},x))=\underline{\phi}^T(d(x_{b,i},x))\underline{w} \quad (1)$$

In Eq. (1), $w_i$ is the weighting coefficient for each RBF and $d(x_{b,i}, x)$ 384 the distance between the $i^{th}$ base node 322 and the interpolation node x 324. Note that $d(x_{b,i}, x)$ 384 may be calculated along the mesh topology and not in Cartesian coordinates. To this end, for instance, a fast marching algorithm may be used.

For all N base nodes $x_{b,i}$, Eq. (1) forms a linear equation system: $\underline{h}=\underline{\phi}^T$, where the weighting coefficients $w_i$ are the unknowns. For solving this equation system, regularization may be used so as to avoid a non-invertible matrix.

After the calculation of weighting coefficients $w_i$, the distance h(x) may be determined for each interpolation node 324 according to Eq. (1). The surface nodes may be duplicated to obtain duplicated nodes 342, and translated along their normal according to the interpolated distance h(x) forming the new intermediate layer mesh 340. After interpolation of the new intermediate layer mesh 340, different post-processing steps may be performed:

1) Avoid negative values for the height $h_b$ or to ensure a minimum height;
2) Ensure that boundary nodes 326 at the mesh borders of the surface mesh 320 and the new intermediate layer mesh 340 are tied together, indicated in FIG. 5 as non-filled (white) stars. It is noted that this may be an artificial rather than anatomical requirement. To obtain a minimal deviation from the interpolated values in the neighborhood of the borders, this requirement may be introduced as a post-processing step instead of including the border nodes as base nodes with a height $h_b=0$ in the RBF interpolation; and
3) Smoothing to erase shape errors of the intermediate layer mesh 340 caused by interpolation, e.g., so as to eliminate overlaps or mesh intersections.

To carry out steps 1) and 2), a post-processing with a so-termed softmax function might be used. A softmax function, e.g., softmax(hp, $h_{min}$)=log($e^{hp}+e^{hmin}$) provides a continuous transition, in contrast to a normal maximum function. Another possibility to carry out step 1) is to subtract the minimum distance from the given distance $h_b$ of the base nodes prior to RBF interpolation and add the minimum height to each interpolation nodes as well as to all base nodes after the interpolation again. A possibility to carry out step 3) may be a refinement of all node locations by minimizing an energy function penalizing undesired mesh states. Energy terms may take into account, e.g., the deviation of edge lengths between the surface mesh 320 and the new intermediate layer mesh 340, a spatial deviation of the intermediate layer nodes 342 from the normal of the surface mesh nodes 322, 324, and the growth of intermediate layer edges in general. In an optional step, the cavity between intermediate layer mesh 340 and surface mesh 320 and/or between other intermediate layer meshes may be meshed to obtain a tetrahedral/volumetric mesh. A suitable meshing tool is, e.g., tetgen (http://tetgen.berlios.de/). Due to the identical mesh topology of all mesh layers, a manual meshing is also possible.

For adapting the deformable model to patient data (i.e., for applying the deformable model to the image data of the medical image of a patient), one of the two following approaches may be used:
1) During the model adaptation, the endo- and epicardial borders of the myocardium may be fitted via an external energy term (which is known per se from model-based segmentation) to the visible heart boundaries in the image. The intermediate layers (if not visible in the images) may be adjusted just via the internal energy; or
2) During the model adaption, only the endocardial and/or epicardial border of the myocardium may be adapted to the image. Subsequently, in a post-processing step, the remaining intermediate mesh layers are constructed using the relative encoding of intermediate layer nodes to the adapted surface mesh.

A specific example of the first approach may be the following: the generated deformable model may be used to construct a hierarchical model for model-based segmentation. Here, each level of the hierarchical model may consist of a deformable sub-model and a parameter file that steers its adaption. In the lower level of the hierarchical model, a deformable sub-model may be used which is comprised only of those meshes which correspond to visible anatomical structures in the image data. The generated deformable model may be split in such a sub-model by exploiting the label information (such as 'IntermediateLayer1', 'IntermediateLayer2', 'LAEpicardium', 'LAEndocardium', . . . ) which may be assigned to each mesh triangle. For example, the surface meshes corresponding to 'LAEpicardium' and 'LAEndocardium' may be selected. To steer the adaption, a parameter file comprising the typical parameters and values for heart segmentation may be used, using an internal energy term and an external energy term in an affine and transformable adaptation. In the next higher level, the deformable sub-model may be replaced by the (overall) generated deformable model. Due to the linking of meshes, e.g., via correspondence lists of nodes, all previously adapted meshes may keep the shape resulting from the image segmentation and may be marked as unchangeable in this level of the hierarchical model. All other (intermediate) mesh layers may then be interpolated using only the internal energy term, i.e., the weighting factor for the external energy term may be zero in the parameter file.

A specific example of the second approach may be the following: the deformable model may be used in a post-processing step. Here, as in the specific example of the first approach, a deformable sub-model may be generated which is comprised only of those meshes which correspond to visible anatomical structures in the image data. Then, a model-based segmentation with the usual parameter values for heart segmentation may be performed. In a post-processing step, the other (intermediate) mesh layers may be applied by using a relative encoding of these mesh layers to the adapted surface mesh(es). The relative encoding may use local coordinates, i.e., relative to the adapted surface mesh (es) instead of global coordinates. A detailed description of the encoding mechanism can be found in "*From Image to Personalized Cardiac Simulation: Encoding Anatomical Structures into a Model-Based Segmentation Framework*" by H. Nickisch et al., STACOM, 2012.

It is noted that, in general, the intermediate layer mesh may also be applied based on an optimization comprising an external energy term, the external energy term being defined as a function of image data of the medical image. This holds in particular if a corresponding intermediate anatomical layer is clearly visible in the image data.

It is noted that in FIG. 4, also the mesh topologies between the inner surface mesh 320 and the outer surface mesh 360 have matching mesh topologies. This may be obtained by initially providing one of the surface meshes, e.g., the outer surface mesh 360, and generating the inner surface mesh 320 in a same or similar manner as the intermediate layer mesh 340. For example, all layers inward of the outer surface mesh 360 may be sequentially generated. This provides additional regularity to the deformable model.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be subdivided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for generating a deformable model for segmenting an anatomical structure in a medical image the anatomical structure comprising a wall having a first surface layer and a second surface layer, the method comprising:
    providing a first surface mesh for being applied to the first surface layer of the wall during a model-based segmentation;
    providing a second surface mesh for being applied to the second surface layer of the wall during the model-based segmentation;
    generating an intermediate layer mesh for being applied in-between the first surface layer and the second surface layer during the model-based segmentation, said generating comprising matching a mesh topology of at least part of the intermediate layer mesh to the mesh topology of an anatomically corresponding part of a selected one of both surface meshes, thereby establishing matching mesh topologies; said generating comprising duplicating the part of the selected surface mesh to obtain the part of the intermediate layer mesh;
    generating model data defining the first surface mesh, the second surface mesh and the intermediate layer mesh, said generating comprising defining correspondences between original nodes of the selected surface mesh and duplicated nodes of the intermediate layer mesh, thereby establishing a plurality of node pairs;
    wherein the generating of the model data further comprises minimizing an energy function penalizing undesired mesh states;
    wherein the minimization of the energy function is determined by a) a deviation of edge lengths between the surface mesh and the intermediate layer mesh, or b) a spatial deviation of the duplicated nodes from the original nodes, or c) a growth of intermediate layer mesh edges.

2. The method according to claim 1, further comprising generating a volume mesh between the intermediate layer mesh and the selected surface mesh based on the correspondences between the original nodes and the duplicated nodes of the node pairs.

3. The method according to claim 1, further comprising generating a number of intermediate layer meshes for being applied in-between the first surface layer and the second surface layer of the wall, the number being larger than one.

4. The method according to claim 3, wherein the number is established based on at least one of the group of: an input from a user, an anatomy of the wall, and a spatial resolution of the medical image.

5. The method according to claim 1, wherein the intermediate layer mesh is generated for being applied to one of the group of: an intermediate anatomical layer of the wall, and an artificially defined layer.

6. The method according to claim 1, further comprising:
providing one of: the first surface mesh and the second surface mesh; and
generating the remaining one of: the first surface mesh and the second surface mesh, said generating comprising establishing matching mesh topologies for anatomically corresponding parts of both surface meshes.

7. A non-transitory computer-readable medium comprising a computer program product comprising instructions for causing a processor system to perform the method according to claim 1.

8. A non-transitory computer readable medium comprising instructions for causing a processor system to perform operations defining a deformable model, the deformable model being arranged for segmenting an anatomical structure in a medical image, the anatomical structure comprising a wall having a first surface layer and a second surface layer, the deformable model comprising:
a first surface mesh for being applied to the first surface layer of the wall during a model-based segmentation;
a second surface mesh for being applied to the second surface layer of the wall during the model-based segmentation; and
an intermediate layer mesh for being applied in-between the first surface layer and the second surface layer during the model-based segmentation, wherein at least part of the intermediate layer mesh comprises a mesh topology which matches the mesh topology of an anatomically corresponding part of a selected one of both surface meshes, thereby establishing matching mesh topologies, wherein the intermediate layer mesh is generated by duplicating the part of the selected surface mesh to obtain the part of the intermediate layer mesh;
wherein the deformable model is generated by defining correspondences between original nodes of the selected surface mesh and duplicated nodes of the intermediate layer mesh, thereby establishing a plurality of node pairs,
wherein the deformable model is generated by minimizing an energy function penalizing undesired mesh states, wherein the minimization of the energy function is determined by either: a) a deviation of edge lengths between the surface mesh and the intermediate layer mesh, orb) a spatial deviation of the duplicated nodes from the original nodes, or c) a growth of intermediate layer mesh edges, or any combination thereof.

9. A system for applying a deformable model to an anatomical structure in a medical image, the anatomical structure comprising a wall having a first surface layer and a second surface layer, the system comprising:
a non-transitory computer readable medium according to claim 8; and
a processing subsystem configured for applying the deformable model to the anatomical structure in the medical image.

10. The system according to claim 9, wherein the processing subsystem is configured for applying the deformable model to the anatomical structure by:
applying the first surface mesh to the first surface layer of the anatomical structure and the second surface mesh to the second surface layer of the anatomical structure based on an optimization comprising an external energy term, the external energy term being defined as a function of image data of the medical image; and
applying the intermediate layer mesh in-between the first surface layer and the second surface layer of the wall based on one of the group of: use of an internal energy term in the optimization, and data being indicative of a relative position of the intermediate layer mesh with respect to one of said applied surface meshes.

11. The method according to claim 1, wherein the generating of the model data further comprises defining distances between the original nodes and the duplicated nodes of the node pairs.

12. The method according to claim 1, wherein the generating of the model data further comprising:
providing a first set of distances for a first subset of the node pairs;
obtaining a second set of distances for a second subset of the node pairs by interpolating the first set of distances.

* * * * *